June 23, 1931.  R. C. WISEMAN  1,811,413
POULTRY FEED TROUGH
Filed Oct. 6, 1930  3 Sheets-Sheet 1
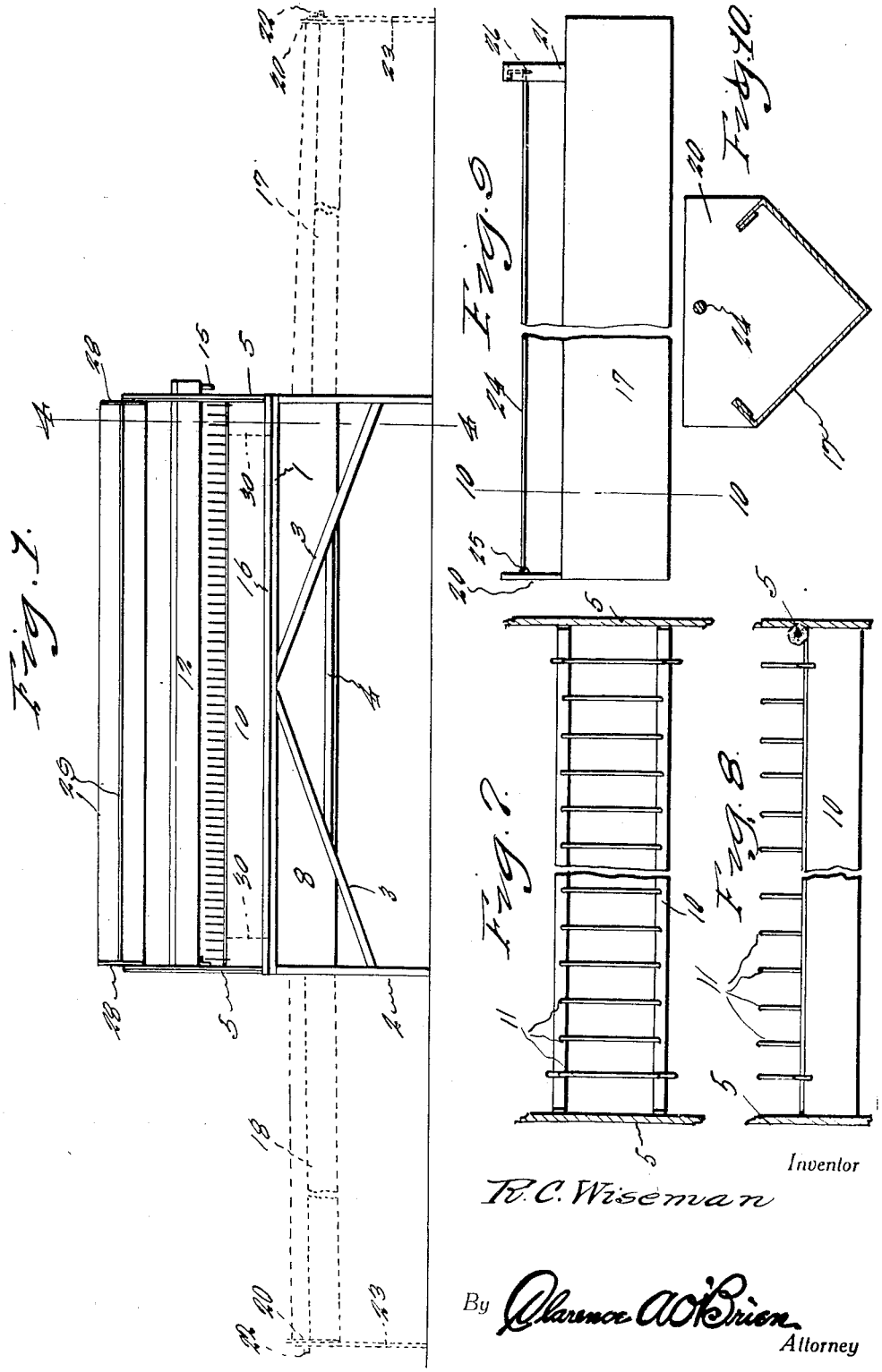
Inventor
R. C. Wiseman
By Clarence A. O'Brien
Attorney

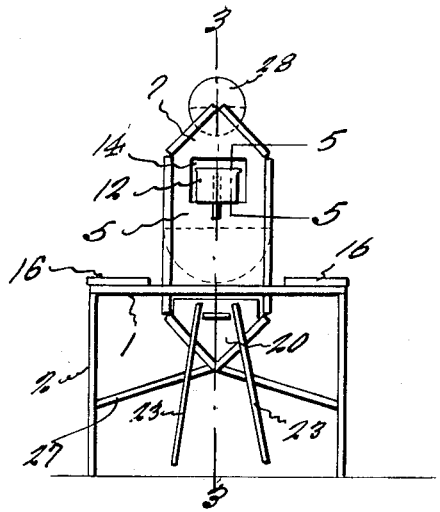
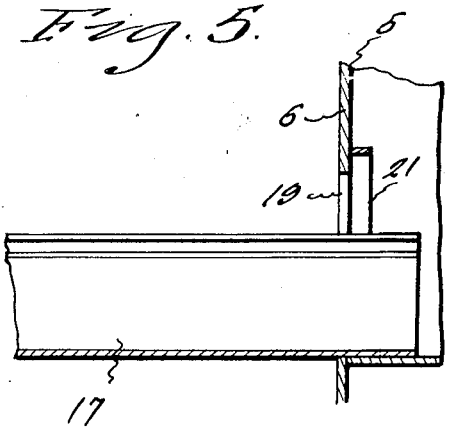
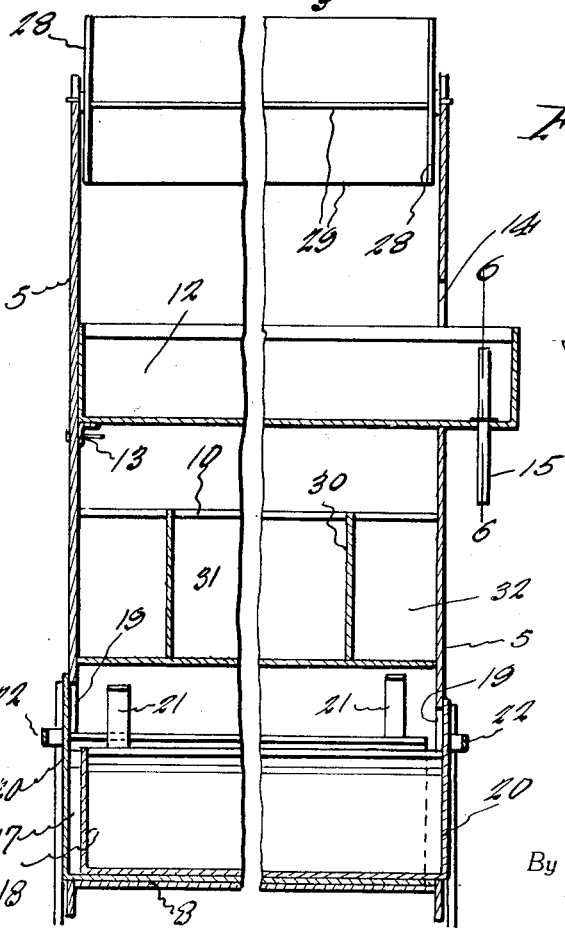
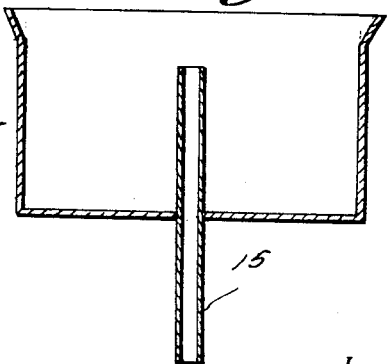

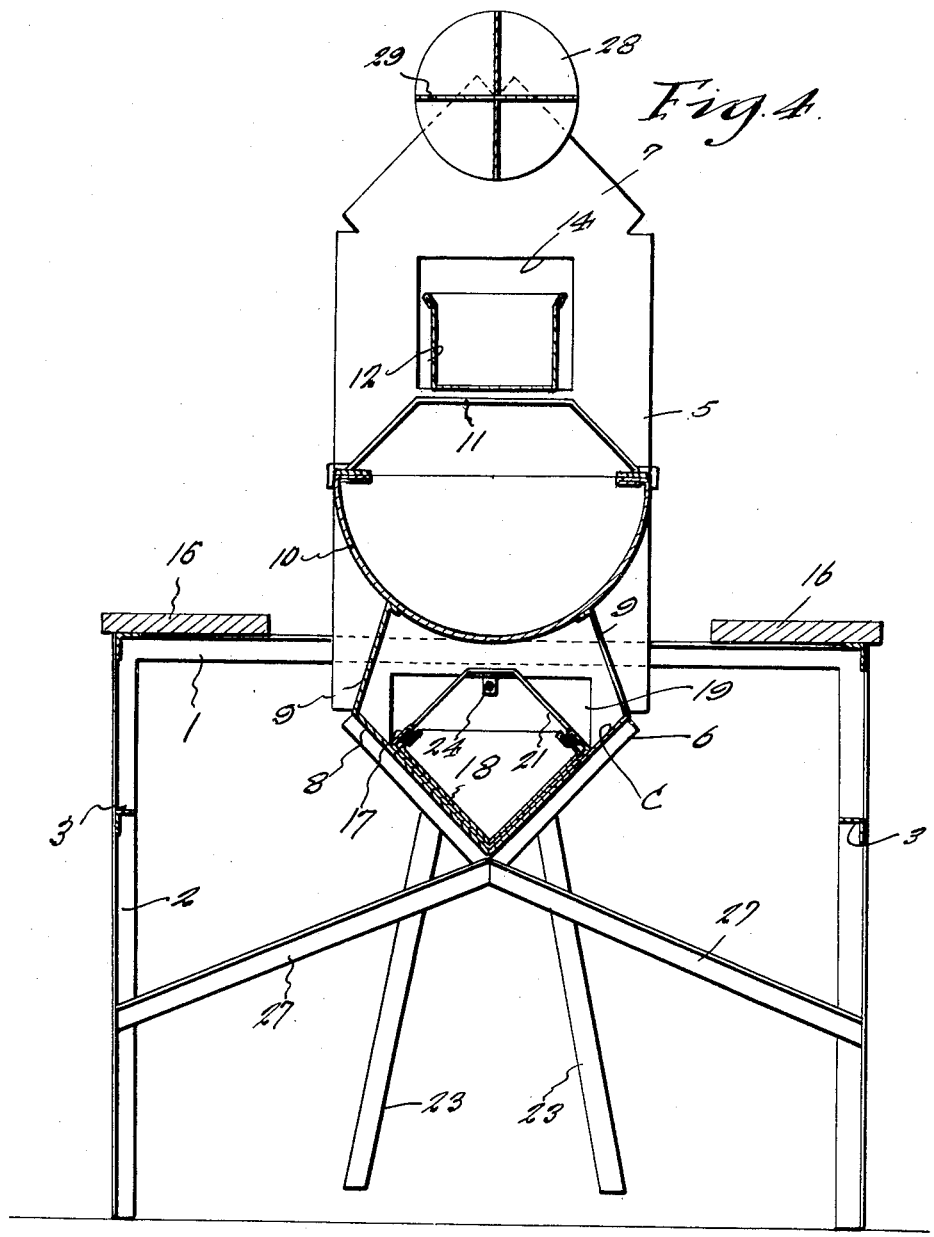

Patented June 23, 1931

1,811,413

UNITED STATES PATENT OFFICE

RAY C. WISEMAN, OF PARKERSBURG, WEST VIRGINIA

POULTRY FEED TROUGH

Application filed October 6, 1930. Serial No. 486,781.

This invention relates to certain new and useful improvements in troughs for holding feed, water, and the like, and from the contents of which troughs the poultry may partake in an expeditious manner, and with a minimum amount of waste of the food and drink provided for the poultry.

A still further object of the invention is to provide a trough of the above mentioned character which includes a novel arrangement of troughs or containers so arranged relative to one another as to permit the poultry to partake of the contents of any one trough without danger of spilling the contents of one trough into a second trough, and further without danger of the contents of the respective troughs or containers becoming polluted as may be occasioned where the arrangement of the containers is such as to permit the poultry obtaining bodily access to the individual troughs or containers.

A still further object of the invention is to provide a feed trough of the above mentioned character which will be highly sanitary, comparatively simple in construction, require a minimum amount of care, and further wherein the troughs are so arranged as to prevent one container or trough from interfering with the other and wherein the entire structure will require but a minimum amount of space without sacrificing durability in the structure.

Other objects and advantages of the invention will become apparent during a study of the following description, taken in connection with the accompanying drawings wherein:

Figure 1 is a side elevational view of the feed trough, the slidable trays or containers in their extended positions being suggested by broken lines.

Figure 2 is an end elevational view of the feed trough on a reduced scale.

Figure 3 is a longitudinal vertical sectional view therethrough taken substantially on the line 3—3 of Figure 2.

Figure 4 is a transverse sectional view taken substantially on the line 4—4 of Figure 1.

Figure 5 is a fragmentary detail sectional view taken substantially on the line 5—5 of Figure 2.

Figure 6 is a fragmentary detail sectional view taken substantially on the line 6—6 of Figure 3.

Figure 7 is a fragmentary detail view partly in section and partly in elevation viewing the dry mash trough from the top thereof.

Figure 8 is a similar view viewing the said trough from the side thereof.

Figure 9 is a side elevational view of a modified form of grain drawer.

Figure 10 is a transverse sectional view therethrough taken substantially on the line 10—10 of Figure 9.

With reference more in detail to the drawings, it will be seen that the improved poultry feeder comprises a substantially rectangular elongated frame 1 supported on legs 2 arranged one at each corner of the frame. The legs 2 are braced with respect to the frame through the medium of suitable brace rods 3, which rods 3 are in turn braced with respect to one another through the medium of horizontal brace rods 4.

Rising from each of the end members of the frame 1 is a plate 5, spaced inwardly from opposite sides of the frame. Each of the plates 5 includes a substantially triangular lower end portion 6 that extends downwardly below the frame, and an upper substantially triangular shaped end portion 7. The intermediate portion of each of the plates 5 is of substantially elongated rectangular configuration.

Supported between the lower end portion 6 of the plates is a horizontally disposed casing 8 that is substantially V-shaped in cross section and has the side walls thereof adjacent the upper end of the trough merging into longitudinally extending inwardly and upwardly directed wall portions 9 that support on their upper edges an elongated trough 10 that is substantially semi-cylindrical in cross section. The trough 10 which is opened at its top, is thus supported above the top of the frame 1, and extends between the plates 5.

A plurality of longitudinally spaced, substantially inverted U-shaped rods 11 extend transversely of the trough 10, the ends of the rods being suitably secured to the upper flanged edges of the side walls of the trough 10. The rods 11 provide a suitable grating through which the poultry may gain sufficient access to the interior of the trough for partaking of the contents of the trough 10 and at the same time prevents the poultry from gaining bodily access into the trough thus maintaining the contents of the trough from contamination. The trough 10 is especially adapted to contain dry mash and the bottom of the trough being rounded prevents the feed from sticking in corners of the trough and thus becoming stale.

Suitably supported above the trough 10 and extending between the plates 5 is an elongated water trough 12. One end of the trough 12 and one of the plates 5 are provided with cooperating means 13 for removably supporting said end of the trough 12 from said one plate 5 while the other end of the trough extends through a suitable opening 14 provided therefor in the other of the plates 5. Extending through the bottom of the trough 12 at the last referred to end of the trough, is a suitable overflow pipe 15.

To accommodate the poultry feeding from the trough 10, I provide on opposite sides of the casing 8 platforms 16 which are in the nature of elongated boards of suitable width and the same are supported on the frame 1 adjacent opposite longitudinal sides of the frame and extend longitudinally for the full length of the frame, the poultry on said platforms easily feeding and drinking from troughs 10 and 12 respectively.

Slidably supported within the casing 8 is a pair of telescoping trays 17 and 18 respectively. These trays are identical in construction, and preferably are triangular in cross section being opened at their tops and at one end.

The trays 17 and 18 are adapted to slide inwardly and outwardly of the casing 8 in opposite directions relative to one another through suitable openings provided in the lower end portion 6 of the plates 5, the openings in said ends 6 being designated by the reference character 19. The end walls 20 of each of the trays 17 and 18 at the upper edge thereof extend beyond the upper edge of the side walls of the trays to abut the adjacent plates 5 when the trays are moved inwardly of the casing 8 to limit the said inward movement of the trays. Furthermore, each of the trays, adjacent their opened end, is provided with a suitable upwardly extending stop 21 adapted to engage the plate 5 when the trays are moved outwardly to the positions suggested by dotted lines in Figure 1, thus limiting the outward movement of the trays.

Each of the trays, at the closed end 20 thereof is also equipped with a suitable handle 22 and with a pair of supporting legs 23 for supporting the outermost ends of the trays when said trays are in outer or extended position, or in that position suggested in Figure 1.

Of course, it is to be understood that the casing 8 will be of such a height above the ground or floor that if the trays 17 and 18 are in their extended positions, the same will also be a sufficient height above the ground or floor as to enable the poultry to feed conveniently therefrom. The trays 17 and 18 are especially adapted to contain grain or wet mash as may be desired.

If desired, and as clearly suggested in Figures 9 and 10, each of the trays 17 and 18 may be fitted with a horizontally disposed rod 24 that is suitably secured at one end as at 25 to the end wall 20 of the tray adjacent the upper edge of said wall, and at its opposite end the rod 24 may be suitably supported from the stop 21 as at 26. The rod 24 which will thus extend longitudinally of the tray will aid in preventing the fowls from wasting the grain or contents of the tray.

Completing the structure are suitable brace rods 27 for bracing the lower ends 6 of the plates 5 with respect to the legs 2. Also, rotatably supported between the upper ends 7 of the plates 5 is a suitable reel that includes a pair of end discs 28 that are connected together through the medium of longitudinally extending radial fins or blades 29. The purpose of the reel is to prevent birds from getting into any of the feed containers of the trough or for roosting on the feed trough.

Attention being directed to Figures 1 and 3, it will be seen that there is arranged in the dry mash trough 10 adjacent each end of the trough a vertical transversely disposed partition 30. The partitions 30 thus divide the trough 10 into an intermediate compartment or bin 31 especially adapted to receive the dry mash, and into end bins or compartments 32 especially adapted to contain therein grit, oyster shells or the like.

From the foregoing it will be seen that I have provided a complete feeder or trough for poultry, and preferably, in the construction of the same, all the parts such as the frame, trough 10, water trough 12, casing 8, and trays 17 and 18 are formed from metal or like material thus rendering the feeder strong as well as sanitary. Furthermore, it will be seen that such an assembly permits of a convenient arrangement of the several elements of the combination resulting in a feeder of this character whereby the poultry may partake of the contents of the several feed containers and at the same time providing for such an arrangement of containers eliminating unnecessary bulk without sacrificing expeditious feeding of the poultry.

Even though I have herein shown and described the preferred embodiment of my invention, it is to be understood that the same is susceptible to changes fully comprehended by the spirit of the invention as herein described and the scope of the appended claims.

Having thus described my invention, what is claimed is:

1. A poultry feeder of the class described comprising in combination, a casing, feed trays slidably mounted in said casing, said casing being open at its ends whereby said trays may be moved relative to one another into and out of said casing, said casing being open at its top, and a feed containing trough supported on the upper edge of said casing normally closing said top.

2. A poultry feeder comprising in combination, a casing open at the top and end thereof, a feed containing trough mounted on the top of said casing normally closing said top, a water trough disposed above said feed trough, supporting means for said water trough, and a pair of telescoping trays arranged in said casing to be moved into and out of said casing through the open end of said casing.

3. A poultry feeder comprising in combination a pair of spaced apart vertically disposed plates, a casing connecting the lower ends of said plates, said plates at said lower ends provided with openings for the ends of said casing, trays slidably mounted in said casing to be moved inwardly and outwardly of the latter through the openings in said plates, and a feed trough mounted between said plates above said casing.

4. A poultry feeder comprising in combination a pair of spaced apart vertically disposed plates, a casing connecting the lower ends of said plates, said plates at said lower ends provided with openings for the ends of said casing, trays slidably mounted in said casing to be moved inwardly and outwardly of the latter through the openings in said plates, a feed trough mounted between said plates above said casing, said casing being open at its top, and said feed trough normally closing the open top of said casing.

5. A poultry feeder comprising in combination a pair of spaced apart vertically disposed plates, a casing connecting the lower ends of said plates, said plates at said lower ends provided with openings for the ends of said casing, trays slidably mounted in said casing to be moved inwardly and outwardly of the latter through the openings in said plates, a feed trough mounted between said plates above said casing, said casing being open at its top, and said feed trough normally closing the open top of said casing, longitudinally spaced rods extending transversely of said trough at the top of the trough to accommodate therebetween the heads of poultry, and supporting legs carried by each of said trays adjacent one end of the respective trays for supporting said end of the trays when the latter are moved outwardly of said casing.

6. A poultry feeder comprising in combination a casing open at the top and ends thereof, telescoping trays arranged in said casing to be moved relative to one another for movement into and outwardly of said casing through the open ends of said casing, a feed trough supported on the open top of said casing normally closing said top, longitudinally spaced rods extending transversely of said trough at the top of the latter, a horizontally disposed water trough mounted above said first mentioned trough, a rotatably mounted reel disposed above said water trough, and supporting means common to said water trough and said reel.

7. A poultry feeder of the class described comprising a casing open at its ends, telescoping trays arranged in said casing to be moved relative to one another for movement into and out of said casing through the ends of said casing, said trays respectively at one end thereof being open, and at the opposite end thereof being closed, supporting legs carried by each of said trays at the closed ends of the trays, and a stop carried by each of said trays adjacent the open end thereof for limiting outward sliding movement of the trays relative to said casing.

8. A poultry feeder of the class described comprising a casing, telescoping trays arranged in said casing and movable relative to one another into and out of said casing through the ends of said casing, supporting legs carried by each of said trays at one end thereof, stop means for limiting outward sliding movement of the trays relative to said casing, a frame, means for supporting said casing longitudinally of said frame, supporting means for the frame, platforms supported on said frame one on each side of said casing, said casing being open at the top thereof, and a feed trough supported on said casing normally closing said top, said trough being disposed above said platform.

9. A device of the character described comprising a casing open at the top and ends thereof, and a pair of trays mounted in the casing for movement oppositely to one another through the ends of the casing.

In testimony whereof I affix my signature.

RAY C. WISEMAN.